United States Patent [19]

Ballada

[11] Patent Number: 4,851,950
[45] Date of Patent: Jul. 25, 1989

[54] ELECTRICAL APPARATUS FOR MAGNETOTHERMAL AND DIFFERENTIAL PROTECTION

[75] Inventor: Romano Ballada, Milan, Italy

[73] Assignee: Bassani Ticino, S.p.A., Milan, Italy

[21] Appl. No.: 200,690

[22] Filed: May 31, 1988

[30] Foreign Application Priority Data

Jun. 9, 1987 [IT] Italy ................... 20837 A/87
Jun. 9, 1987 [IT] Italy ................... 20840 A/87

[51] Int. Cl.⁴ ............................................ H02H 3/16
[52] U.S. Cl. ................................. 361/44; 361/86; 361/91; 361/152; 361/160; 340/662
[58] Field of Search .................... 361/44–50, 361/86, 91, 62, 93–95, 98–100, 102, 18, 160, 152, 139, 143; 340/662, 641, 643, 664, 650, 651; 364/483, 481

[56] References Cited

U.S. PATENT DOCUMENTS

| 4,037,155 | 7/1977 | Ahmed | 340/664 |
| 4,223,365 | 9/1980 | Moran | 361/71 |
| 4,714,975 | 12/1987 | Dvorak | 361/44 |

*Primary Examiner*—Todd E. DeBoer
*Attorney, Agent, or Firm*—Hedman, Gibson, Costigan & Hoare

[57] ABSTRACT

An electrical apparatus for magnetothermal and differential protection, of the type comprising a device for sensing differential currents associated with a magnetothermal protection switch, comprises a differential current sensor connected to an input of a controlled gain signal amplifier, in turn connected to a plurality of light indicators arranged to go on progressively in dependence on the sensor. The apparatus provides a quantitative and qualitative measurement of the stray current.

2 Claims, 3 Drawing Sheets

ELECTRICAL APPARATUS FOR
MAGNETOTHERMAL AND DIFFERENTIAL
PROTECTION

DESCRIPTION

This invention relates to an electrical apparatus for magnetothermal and differential protection, of the type comprising a differential current sensing device associated with a magnetothermal protection switch.

Electrical protection apparatus of the type noted above are generally designed for use with industrial three-phase low tension power systems.

Known in that field of application are wall-mounted apparatus equipped with gauging instruments which are connected serially in the electric power system and operative to monitor, ahead of the installation of a protection apparatus, the appearance of differential currents, commonly referred to as stray currents.

Such gauging instruments, while being satisfactory performance-wise and serving a number of electrical failure sensing functions, are merely provided with an emergency light indicator which is turned on upon a predetermined threshold value being exceeded of an electric quantity to be gauged.

Such instruments cannot, therefore, provide a quantitative measurement of a stray current and prevent untimely operation of the protection apparatus.

The prior art further proposes the use of portable gauging instruments, commonly referred to as testers, whereby various checking operations can be carried out in connection with power system safety regulations, while also measuring stray currents.

However, gauging instruments of the latter type have the disadvantage that they cannot be combined with the protection apparatus and can only permit an occasional check on the state of an electric power system.

Furthermore, the electronic sensing devices of the aforesaid protection apparatus, are connected "downstream" of the protection switch via a solenoid which acts on the trip-off linkage of the switch.

This solenoid, additionally to opening the switch, affords protection for the electronic sensing device against overvoltages in the power system or in the event of the device itself being shorted, but has the drawback of being ineffective on the occurrence of an interruption in the electric supply phase.

The technical problem which underlies this invention is to provide an electrical apparatus for magnetothermal and differential protection which has such structural and operational characteristics as to afford sensing and a quantitative measurement of differential currents in an electric power system, by overcoming the drawbacks mentioned above in connection with similar prior apparatus.

This problem is solved by an apparatus as indicated being characterized in that said device comprises:
  a sensor for sensing said differential currents;
  a controlled gain signal amplifier connected to the output of said sensor; and
  a plurality of light indicators connected to the output of said amplifier and adapted to be turned on progressively in dependence on said sensor.

The features and advantages of an apparatus according to the invention will be more clearly understood from the following detailed description of an exemplary embodiment thereof, to e read in conjunction with the accompanying illustrative drawings.

Figure 1:
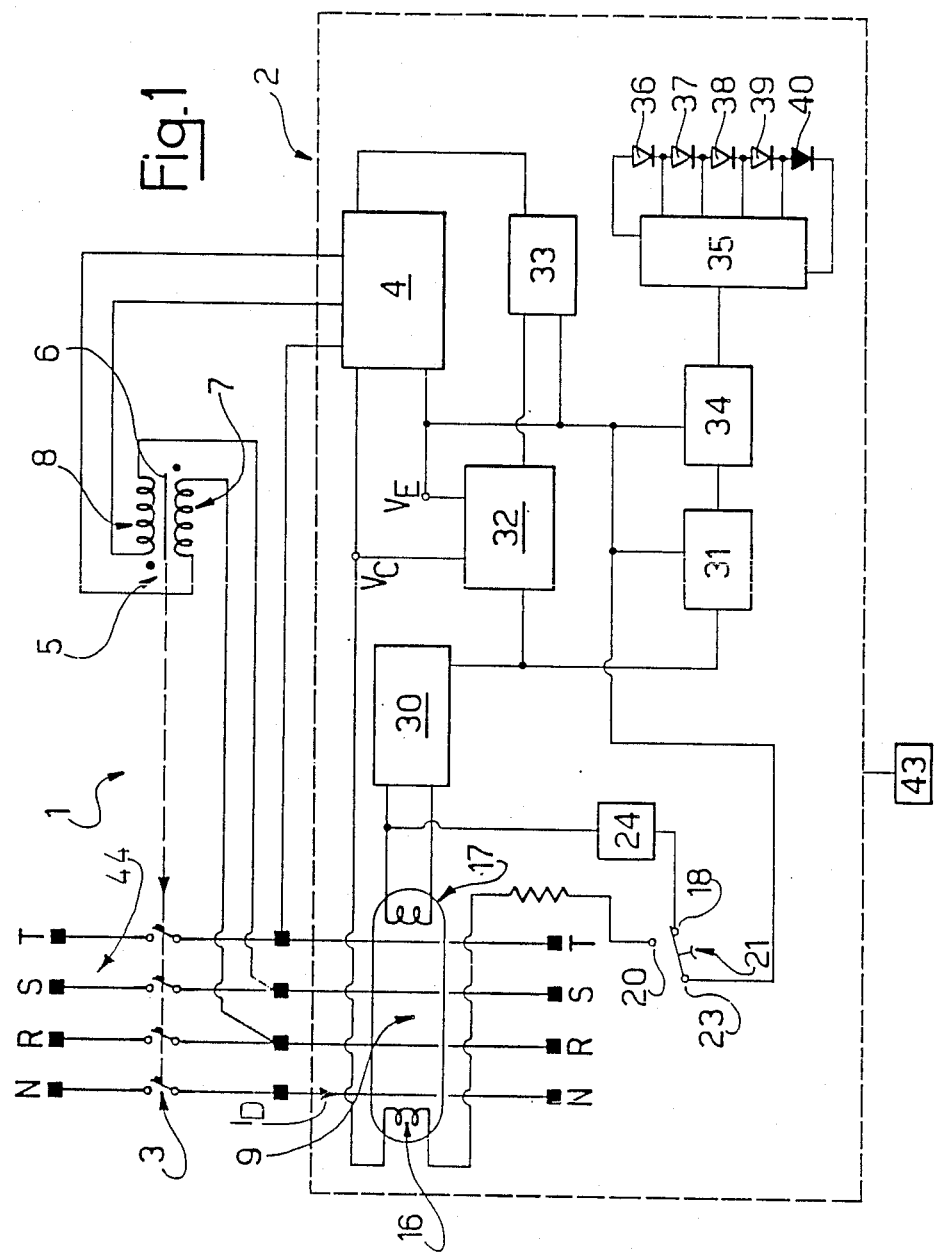
FIG. 1 is a clock diagram showing schematically the protection apparatus of this invention.
Figure 2:
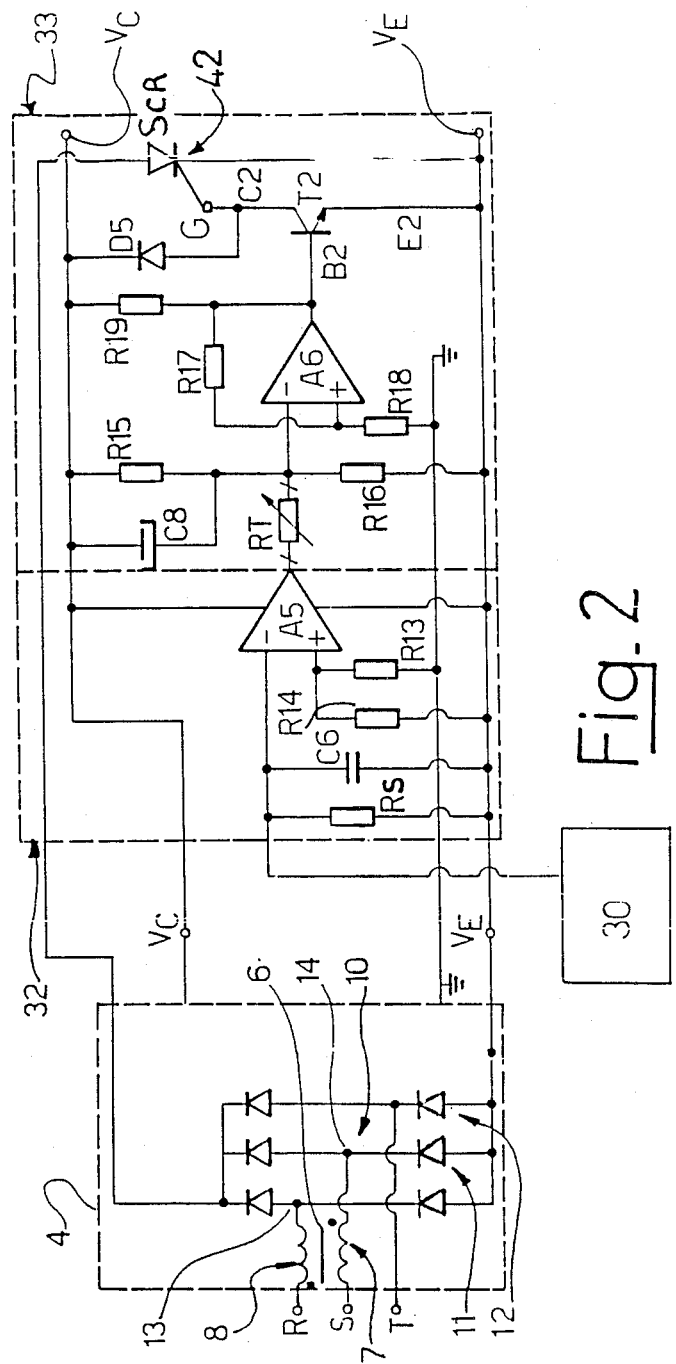
FIG. 2 is a wiring diagram of a detail of the apparatus shown in FIG. 1.
Figure 3:
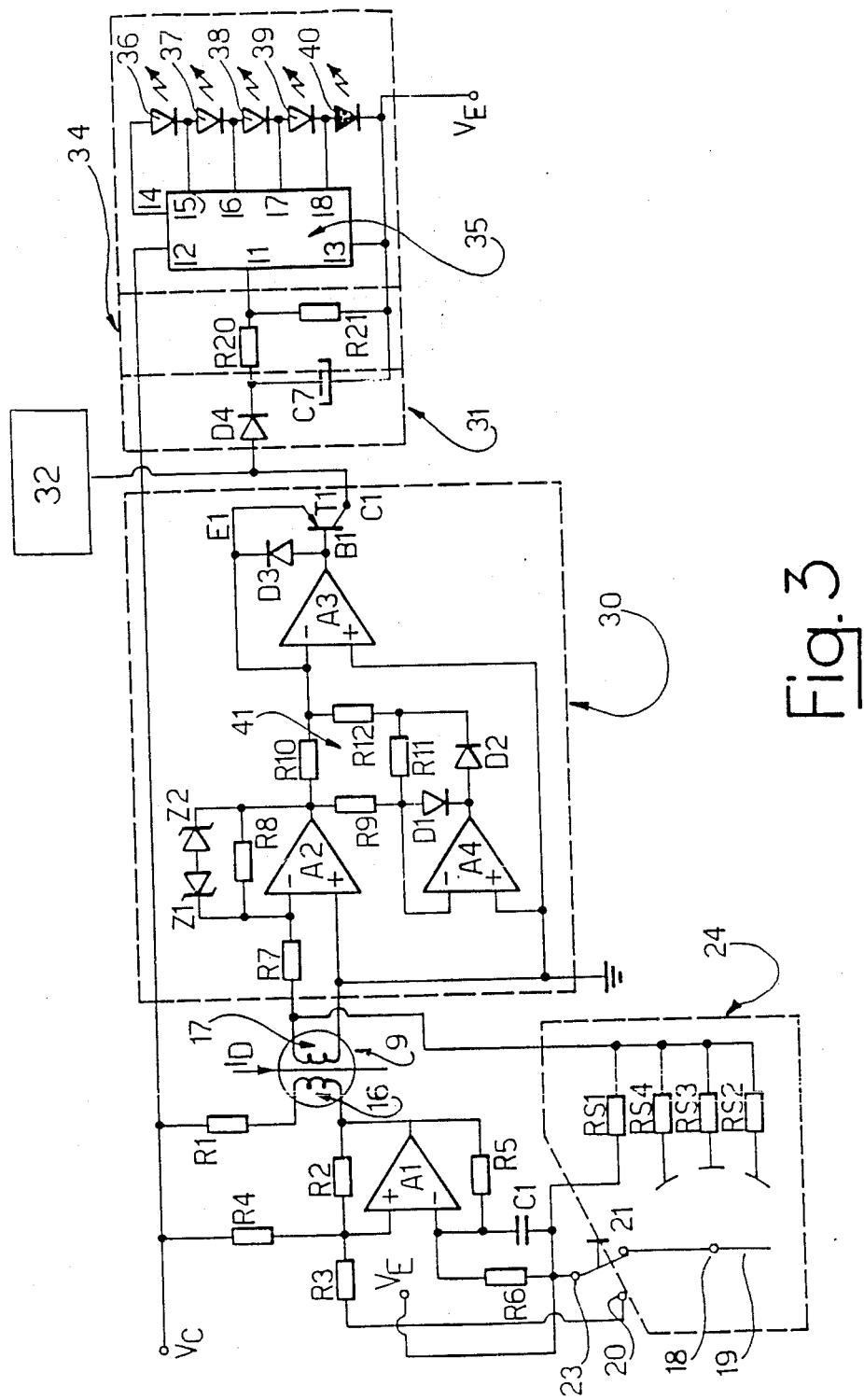
FIG. 3 shows a wiring diagram of another detail of the apparatus shown in FIG. 1.

With reference to the drawing views, the numeral 1 generally designates a schematically depicted electrical apparatus for protection from differential currents Id, also called stray currents, appearing on a three-phase low tension power system. The power system includes conventional phase conductors R, S and T, and a neutral conductor N, which form a four-pole line 44 for a three-phase voltage system designed to power electric loads, not shown because known per se, within a range of values from 50 Volts to 500 Volts AC.

The apparatus 1, which is connected serially in the four-pole power system, comprises an automatic switch 3 for magnetothermal and differential protection, connected serially in the line 44 and having a device 2 associated therewith for sensing said differential currents Id.

The apparatus 1 comprises a plurality of electronic components, to be described in detail hereinafter, which are powered from a supply circuit 4 whose input end is connected to said conductors R, S and T of the three-phase voltage system.

The supply circuit 4 outputs a pair of voltage poles, respectively positive and negative ones, indicated at Vc and Ve and being at levels equal to 10 Volts and −7.5 Volts. The supply circuit 4 is designed to remain operative even with an outage of any of the three phase voltages. More specifically, the supply circuit 4 has at its input a three-phase bridge circuit 10 composed of six diodes which form a pair of diode bridge circuits 11 and 12 sharing a pair of such diodes.

The supply circuit 4 has its input end connected to the conductors R, S and T "downstream" of the switch 3 via a solenoid 5 adapted to operate the break linkage of the switch 3 by means of its plunger 6.

The solenoid 5 comprises first 7 and second 8 windings which are structurally independent of each other and respectively connected between the phase conductor R and an input 13 of the first bridge circuit 11, and between the phase conductor S and an input 14 of the second bridge circuit 12. The second input 15 of either diode bridge circuits 11 and 12 is connected directly to the third phase conductor T.

The sensing device 2 comprises a toric transformer 9 having high magnetic characteristics which is arranged to encircle the phase conductors R, S and T and the neutral conductor N to sense current unbalance occurring therebetween on the appearance of ground-going stray currents Id. The transformer 9 is provided with a winding 16 having one end connected to the positive pole Vc via a resistor R1 and the other end connected, via resistors R2 and R3, to a contact 20 of a test key 21 on the apparatus 1 which is pivoted to a terminal 23 connected to the negative pole Ve and movable from a first position of contact with the center terminal 18 of a selector 24 to a second position associated with the contact 20.

An operational amplifier A1 has its output fed back to the non-inverting input via said resistor R2, with the non-inverting input being further connected to the pole Vc via a resistor R4 and to said contact 20 via the resistor R3. The output from the amplifier A1 is also fed back to the inverting input via a resistor R5; that inverting input is further connected to the terminal 23 through a parallel-connected resistor R6 and capacitor C1. The transformer 9 further includes a secondary winding 17, having approximately one thousand turns, which forms a sensor of said differential currents Id and has its ends connected to a signal amplifier 30.

Further, one end of the secondary winding 17 is connected to the terminal 23 of the test switch 21 via a first resistor RS1 in a group of four resistors of a resistive divider making up the selector 24.

The amplifier 30 is of the controlled gain type tied to the divider selector 24, wherein the remaining resistors RS2, RS3 and RS4 have each one end connected to the secondary winding 17 and the other end available to receive the moving contact 19 associated with the center terminal 18 of the selector 24.

The output of the amplifier 30 is connected to both the input of a differential current threshold sensor 32 and the input of an output signal peak sensor 31.

The output of the sensor 32 is connected to the input of a trip-off actuator 33 operative to drive the switch 3 to break on a differential current being sensed whose value exceeds a predetermined threshold.

The output of the peak sensor 31 is instead connected, via a voltage divider 34 to the input of a driver circuit 35 for light indicators of the LED type, denoted by the reference numerals 36 to 40.

More specifically, the aforesaid amplifier 30 comprises an operational amplifier A2 having its inverting input connected via a resistor R7 to one end of the secondary winding 17 of the transformer 9 and the non-inverting input connected to the other end of said winding 17 as well as to ground.

The output from the amplifier A2 is fed back to the inverting input via parallel connected resistor R8 and pair of push-pull connected Zener diodes Z1 and Z2. The output of said amplifier A2 is further connected to the input of a bridge 41 formed of resistors R9, R10, R11 and R12 and connected with its output to a second operational amplifier A3.

Connected in parallel with the resistor of the bridge 41 are a pair of diodes D1 and D2 having the output connected therebetween of a third operational amplifier A4 which has the inverting input connected between the resistors R9 and R11 of the bridge 41, and the non-inverting input grounded.

Also grounded is the non-inverting input of the operational amplifier A2, whose output is connected directly to the base B1 of a pnp-type transistor T1 having the emitter E1 connected to the base B1 via a diode D3 and to the inverting input of that same amplifier A2.

The collector C1 of the transistor T1 forms the output of the amplifier 30 and is connected directly to the inverting input of an operational amplifier A5 incorporated to the threshold sensor 32. The amplifier A5 is connected electrically between the positive pole Vc and the negative pole Ve, and has its inverting input connected, in turn, to the negative pole Ve through parallel connected capacitor C6 and resistor RS. The non-inverting input of the amplifier A5 is both connected to ground, via a resistor R13, and to the negative pole Ve, via a resistor R14.

The output of the amplifier A5 constitutes the output of the threshold sensor 32 and is connected, via a variable resistor RT, to the inverting input of an operational amplifier A6 incorporated to the trip-off actuator 33. That amplifier A6 has its inverting input further connected to both the positive pole Vc through parallel connected capacitor C8 and resistor R15, and the negative pole Ve via a resistor R16. Further, the output of the amplifier A6 is fed back to the non-inverting input via a resistor R17; that input is also grounded via a resistor R18.

The amplifier output is also connected to the pole Vc via a resistor R19 and to the the base B2 of an npn-type transistor T2 having the emitter E2 connected to the pole Ve and the collector C2 connected to the pole Vc via a diode D5.

Between the collector C2 and the pole Vc is an actuator 42 consisting of a silicon controlled rectifier Scr which is adapted to bypass the three-phase bridge circuit 10 of the supply circuit 4. In particular, the rectifier 42 has a gated input G adapted to receive a signal on a differential current Id being sensed which exceeds the cut-in threshold; upon receiving that signal on the input G, the rectifier 42 bypasses the inputs of the supply circuit 4.

Advantageously, the peak sensor 31 comprises a diode D4 connected to the negative pole Ve via a capacitor C7. Between the diode D4 and the capacitor C7 and an input I1 of the driver circuit 35, there is a resistor R20.

An additional resistor R21 connects between the input I1 and the negative pole Ve, which forms, in cooperation with the aforesaid resistor R20, the voltage divider 34.

The driver circuit 35 includes additional inputs I2 and I3 respectively connected to the positive Vc and negative Ve poles, and has a plurality of outputs, denoted by the reference characters I4 to I8, each connected to one of the LED-type light indicators 36, 37, 38, 39 and 40. These light indicators are cascade connected to one another and the last one, 40, is also connected to the negative pole Ve.

The apparatus 1 of this invention is further provided with a selector 43 consisting of an additional resistive divider through which the trip-off time delay of the switch 3 is adjusted.

The operation of the apparatus according to the invention will be now described.

The secondary winding 17 of the transformer 9 senses a current unbalance between the phase conductors R, S and T and the neutral conductor N in the presence of a group-going leak from a differential current Id.

The signal sensed by the secondary winding 17 is amplifier through the amplifier 30 and supplied to the input of the threshold sensor 32 which, in the event that the differential current exceeds a predetermined threshold level, sends a signal to the input of the trip-off actuator 33 to activate the rectifier 42. Upon operation of the rectifier 42, the three-phase bridge circuit 10 of the supply circuit 4 is short-circuited and the phase supply voltage is applied directly to the windings 7 and 8 of the solenoid 5 to open the switch 3.

The peculiar structure and the connections of the solenoid 5 windings enable it to become operative even without one of the voltage phases. As an example, should there occur a phase voltage outage on the conductor R, the winding 8 of the solenoid 5, and accordingly, the supply circuit 4 for the device 2 would still be alive.

The threshold value of the cut-in current may be changed by means of the selector 24 until differential currents of 30 mA are sensed; with currents of such low values, the moving contact 19 of the selector 24 is left in the open position.

The signal output by the amplifier 30 is further applied to the input of the sensor 31, which extracts the peak value of the signal to pass it, via the voltage divider 34, to the input I1 of the driver circuit 35, which will turn on the LED indicators.

The circuit 35 is designed such that the indicators 36 to 40 go on progressively as the sensed differential current increases, and by increments thereof of about 15%. Thus, the first LED 36 will go on for values of Id equal to 15% of the threshold value set by means of the selector 24; the second LED 37 will go on for differential current values equal to 30% of the threshold value, and so on until the lighting of all five LEDs indicates that a current value has been reached which corresponds to 75% of the cut-in threshold.

CEI (Comitato Elettrotecnico Italiano) Standards provide for differential protection to cut in on detection of a stray current within the range of 50% to 100% of the set threshold level.

Accordingly, lighting of the first three LEDs 36, 37 and 38 will result from a lower differential current being sensed than the cut-in threshold level established by CEI Standards for differential protection.

Lighting of the fourth LED 39 is a warning of possible intervention of the protection, and of the fifth LED 40 of that the apparatus 1 has reached the limit of the protection cut-in band.

By manipulating the selector 24 from the outside, the threshold value for the cut-in current can be changed, automatically adapting the responsiveness of the apparatus 1 and of the driver circuit 35 for the light indicators.

the apparatus of this invention has a major advantage in that it provides a quantitative measurement of the differential currents and combines the protection, control, and warning functions in a consistent manner.

By having the light indicators color coded, the task of the installer is facilitated because he can select the most appropriate level for the differential protection cut-in threshold to suit the leakage characteristics of a power system for which this apparatus is being installed.

Further, the inventive apparatus affords the important advantage of fully retaining its effectiveness even on the occurrence of an outage on any of the supply voltage phases, and that by locating the trip-off solenoid upstream of the differential sensing device, that electronic device can be effectively protected in the event of an overvoltage on the power supply line.

I claim:

1. An electrical apparatus for magnetothermal and differential protection, of the type comprising an automatic protection switch whose break linkage is operated by a solenoid, operatively connected to an electronic device sensing differential currents appearing in a three-phase low tension electric power system, characterized in that said solenoid includes first and second windings structurally independent of each other and respectively connected between first and second phase voltages in said three-phase system and a corresponding input of a supply circuit for said electronic sensing device.

2. An apparatus according to claim 1, characterized in that said supply circuit includes on its input a three-phase bridge circuit consisting of first and second diode bridge circuits, each having an input connected to one of said windings.

* * * * *